United States Patent
Tashman

(10) Patent No.: US 7,263,230 B2
(45) Date of Patent: Aug. 28, 2007

(54) NARROW FIELD ABSTRACT META-DATA IMAGE COMPRESSION

(75) Inventor: Craig S. Tashman, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 10/663,905

(22) Filed: Sep. 17, 2003

(65) Prior Publication Data

US 2005/0058359 A1 Mar. 17, 2005

(51) Int. Cl.
*G06K 9/36* (2006.01)
*G06K 9/46* (2006.01)

(52) U.S. Cl. .................... 382/232; 382/190
(58) Field of Classification Search ............... 382/232
See application file for complete search history.

(56) References Cited

U.S. PATENT DOCUMENTS

| | | | | |
|---|---|---|---|---|
| 5,135,397 | A * | 8/1992 | Yen | 434/2 |
| 6,088,484 | A * | 7/2000 | Mead | 382/232 |
| 6,134,338 | A * | 10/2000 | Solberg et al. | 382/113 |
| 6,246,784 | B1 * | 6/2001 | Summers et al. | 382/128 |
| 6,256,038 | B1 * | 7/2001 | Krishnamurthy | 345/419 |
| 6,266,063 | B1 * | 7/2001 | Baron et al. | 345/419 |
| 6,683,993 | B1 * | 1/2004 | Mead | 382/253 |
| 6,697,497 | B1 * | 2/2004 | Jensen et al. | 382/100 |
| 6,697,538 | B1 * | 2/2004 | Angenent et al. | 382/285 |
| 7,106,332 | B2 * | 9/2006 | Perry et al. | 345/467 |
| 7,123,761 | B2 * | 10/2006 | Kawano | 382/132 |
| 2003/0081840 | A1 * | 5/2003 | Palmer et al. | 382/232 |

* cited by examiner

*Primary Examiner*—Wenpeng Chen
*Assistant Examiner*—Yuzhen Ge
(74) *Attorney, Agent, or Firm*—Whitham, Curtis, Christofferson & Cook, PC; Stephen C. Kaufman

(57) ABSTRACT

An image compression technique in which patterns identified, the means of separating the image components, the parameterization of the patterns, and the lower level numerical encodings are all designed around a narrow class of images, such as two-dimensional projections of three-dimensional visualizations of data generated by numerical weather simulations. The process analyzes an image in terms of perceptual constructs of the human visual system and searches for patterns among analyzed abstractions of the image. The image is then described in terms of the perceptual constructs and the patterns found among them. The image is re-represented by describing the image as a collection of parameterized versions of the patterns prevalent in that class of image. A resulting description is taken outside of the context of abstract patterns. Redundancies in the description are looked for and the data is re-represented so as to eliminate the redundancies and compress the description.

9 Claims, 5 Drawing Sheets

PUT ON ABSTRACT LEVEL

| Analyze the image in terms of perceptual constructs of the human visual system, i.e., define it in terms of abstractions like squares, circles, gradients, rotations, etc. | ─1 |

PATTERN SEARCH ON ABSTRACT LEVEL

| Search for patterns on among these abstractions, in terms of which the image is now described. This is likely done ahead of time by a person. E.g., note that some arrows always bear similar structure but are rotated differently. | ─2 |

COMPRESSION ON ABSTRACT LEVEL

| For a given image that is in the same 'class' as the above image, re-represent the image by describing it as a collection of parameterized patterns. | ─3 |

COMPRESSION ON LESS ABSTRACT LEVEL

| Take the resulting description outside of the context of abstract patterns, and look for redundancy in the description itself, e.g., look for repeated numbers. | ─4 |

*Figure 2*

NARROW FIELD ABSTRACT META-DATA IMAGE COMPRESSION

BACKGROUND OF THE INVENTION

1. Field of the Invention

The present invention generally relates to a technique for two-dimensional image compression and, more particularly, to an image compression technique which represents a narrow class of images with very high efficiency. The invention has particular advantage in the transmission of specialized data through low bandwidth channels.

2. Background Description

Traditional strategies for two- and three-dimensional visualization have been effective in the development of interactive applications utilizing either workstation- or PC/game-class three-dimensional graphics systems with sufficient bandwidth for timely access to the data of interest. When remote access to the visualizations is required, the limited bandwidth becomes the primary bottleneck. To address this, data compression is considered as way of more effectively leveraging fixed and limited bandwidth for data transmission.

Data compression focuses largely on pattern manipulation. This is consistent with the entropy maximization principle of information theory. Clearly, by maximizing entropy, the number of patterns in a data stream are reduced, thereby removing redundancy and yielding a less bulky representation of the data. This operation entails the identification and re-representation of the pattern, the former being of particular difficulty. Hence, it is desirable to have the pattern identified a priori. For example, consider difference pulse code modulation (DPCM), in which the pattern of relative nearness of each succeeding value to its predecessor is exploited. By representing the data to remove the pattern, substantial reductions in required space may be made.

The human visual system is a source of the aforementioned pre-identified patterns for use in compression, some of which may be hierarchical. Therefore, levels of abstraction are introduced. The higher the level of abstraction, the more layers of human perceptual constructs are available to the compressor as starting points for pattern searching, and the closer the data are to their perceived meaning. In the present work, the image data are raster images depicting two-dimensional (2-D) projections of three-dimensional (3-D) scenes. Among the levels of abstraction for these data are bit-stream, pixel-map, 2-D geometry, and 3-D surfaces. Each implies different sets of redundancy when different sets of human perceptual constructs are used as starting points. For example, at the 2-D geometry level, a rectangular construct may be identified, and then re-represented as a directive for a rectangle followed by parameters.

At the least abstract (bit stream) level, virtually no human perceptual constructs are employed as a starting point for other patterns to be identified. Still, some patterns among the bits may be found, as seen by the performance of a generic compression algorithm (e.g., the LZW compression scheme).

At the pixel map level, some perceptual constructs are employed. These include the grid organization of the color values, the particular color space used, etc. In combination, simple patterns such as constant color areas of the image can be represented in a more compact way. The Joint Photographic Experts Group (JPEG) compression algorithm operates at this level by utilizing the reduced human perception of higher spatial frequencies of intensity values.

The 2-D geometry level of abstraction takes the context at the pixel map level and adds the perceptual constructs of geometry, such as lines, polygons, curves, etc. These patterns build on the basic constructs of color spaces, grids, etc. from the previous level. It is important to differentiate compression at this level from the common reverse-rasterization seen in the tracing applications available from companies like Corel and Adobe. The distinction is that the tracer uses a generic set of geometric patterns, while the compressor uses a set of geometric patterns most likely to be found in the images being compressed. Essentially, this is a custom metadata format, which will be very useful for compression of images having very similar types of geometric patterns. The 3-D surface level takes the geometric constructs identified at the previous level and matches the geometric patterns to projections of 3-D surfaces.

SUMMARY OF THE INVENTION

It is therefore an object of the present invention to provide an image compression technique in which patterns identified, the means of separating the image components, the parameterization of the patterns, and the lower level numerical encodings are all designed around a narrow class of images.

According to one application of the invention, images of the class exemplified by two-dimensional projections of three-dimensional visualizations of data generated by numerical weather simulations are compressed. These images are ideal candidates for compression at several levels of abstraction, especially the geometric. They compress well at the geometric level for several reasons: one being the lack of noise in the images, which increases both the reliability and simplicity of algorithms used to analyze the geometric structures of the image. Additionally, the ability to obtain only some elements of the image at a time, access to original geometry, etc., vastly simplifies the process of breaking the image into components.

Specifically, these components of which the image is composed tend to consist of several basic elements including 2-D projections of translucent 3-D isosurfaces, projections of color-filled contour bands, arrows facing various directions in 3-D space, text, and a constant background image.

One of the components for which the conception of a compressed representation is most beneficial is the 2-D projections of 3-D isosurfaces. There are several patterns that have been identified within these projections on the 2-D geometric abstract level. One is the nature of the projections' borders: these borders usually tend to be very smooth, and apparently continuous. Additional pattern is seen within the interior of these projections: the color is constant, and with a substantially constant transparency. Also, these projections represent generally convex 3-D objects, and as such their interior fill has a shaded appearance, that one can, to a high degree, approximate from nothing more than the shape of their borders. These patterns are therefore exploited by re-representation in several ways: The smoothly curved borders are re-represented as sequences of second order Bèzier curves; and the interior is represented by only a color parameter, since the shaded, translucent fill (which is derived entirely from the given border shape) is inherent to the definition of the "isosurface projection" pattern. Indeed, the nature of the isosurface projection can be said to be a pattern, composed of the lower level patterns given above, which themselves may or may not require additional parameters.

Color filled contours are compressed in much the same way as the isosurfaces, except their interiors are a solid color, not a gradient. The 2-D projections of arrows pointing to different directions in 3-D space are compressed at the 3-D surface level in a very simple way. The pattern of their morphological constancy from arrow to arrow allows them to be represented by a directive to generate an arrow, followed by a color and direction vector, the values for which are extracted directly from the numerical weather model. Additionally, the locations of the arrows remain constant from image to image (for a given geographical area), and therefore need only be transmitted for the first image; each subsequent image need only state which geography it relates to. Thus, a simple temporal pattern in the nature of the spatial organization of the arrows is also exploited.

The result of this re-representation of the image data is a custom metadata image format, which eliminates the pixelmap level of abstraction. It also introduces a new, lower level of abstraction, the metadata structures level. Here, all of the actual pattern references and parameters exist. Much like with the geometric abstract level, there is a considerable amount of pattern when the data are viewed on this level as well. For example, each of the control and end points for the Bèzier curve sequences tend to be located relatively near the previous point in each such sequence. Thus, this pattern is exploited by the simple technique of storing, for each control or end point, the vector distance from the previous point, or the vector distance from some common local origin—whichever will result in a more efficient representation. Similarly, the data representing the colors and directions for the arrows is stored by the difference from the previous, adjacent value, rather than in absolute terms. Techniques like these are critical in order to ensure that the image is maximally compressed, and not simply compressed on one level. When compressed at the abstract levels alone, one sample image required 3522 bytes. When additional compression at the metadata structures level was incorporated, the size was reduced to 1814 bytes. When this image was reconstructed and compressed with the JPEG algorithm at the lowest quality level with vertical subsampling, the size was 9915 bytes. When compressed with JPEG at a more reasonable quality level, the image was 16447 bytes. In contrast, compression on the bit-stream level alone by means of WinZip's highest compression level applied to a bitmap version of the image yielded a file of 36269 bytes. Thus, we see the benefit introduced by engineering an image compression scheme specifically around a narrow class of images that the scheme is intended to compress: It allows compression on the more abstract levels of representation of the data. One thus achieves dramatically better compression ratios, which are only further increased by performing an additional compression operation on the underlying data structures of the abstract, compressed representation.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a high level flow diagram of the compression technique according to the present invention;

DETAILED DESCRIPTION OF A PREFERRED EMBODIMENT OF THE INVENTION

Referring again to the drawings, and more particularly to FIG. 2, there is shown, in general terms, the basic idea of the invention. The process begins in step 1 by analyzing the image in terms of perceptual constructs of the human visual system; i.e., the image is defined in terms of abstractions, such as squares, circles, gradients, rotations, and the like. Next, in step 2, patterns are searched for among these abstractions (the abstractions are also, of course, patterns). The image is now able to be described in terms of a hierarchy of patterns. The lower level patterns are the perceptual constructs of the visual system; the higher level patterns are the patterns that exist among the lower ones. The immense difficulty of this task, combined with its only having to be performed at the inception of the compression scheme as a whole, makes it expedient for it to be performed by a person ahead of time. For example, consider the identification that some arrows always bear similar structure but are rotated differently. The analysis of the underlying geometry of the arrows (lines, fill colors, etc.) is the step of putting the image in the context of the patterns of the human visual system; the identification that a 3-D rotation can represent the non-color differences between any such "arrow" is the determination of the higher order pattern. In step 3, for a given image that is in the same "class" as the image(s) on which the above analysis was performed, the image is re-represented by describing it as a collection of parameterized versions of the above patterns. Finally, in step 4, this resulting description is taken outside of the context of abstract patterns and redundancies in the description are sought. This search is performed by looking at the actual numerical values, etc., by which the data are now represented. For example, a given numeric value may be recorded several times in a row, which would be an easily removable redundancy.

Figure 3:
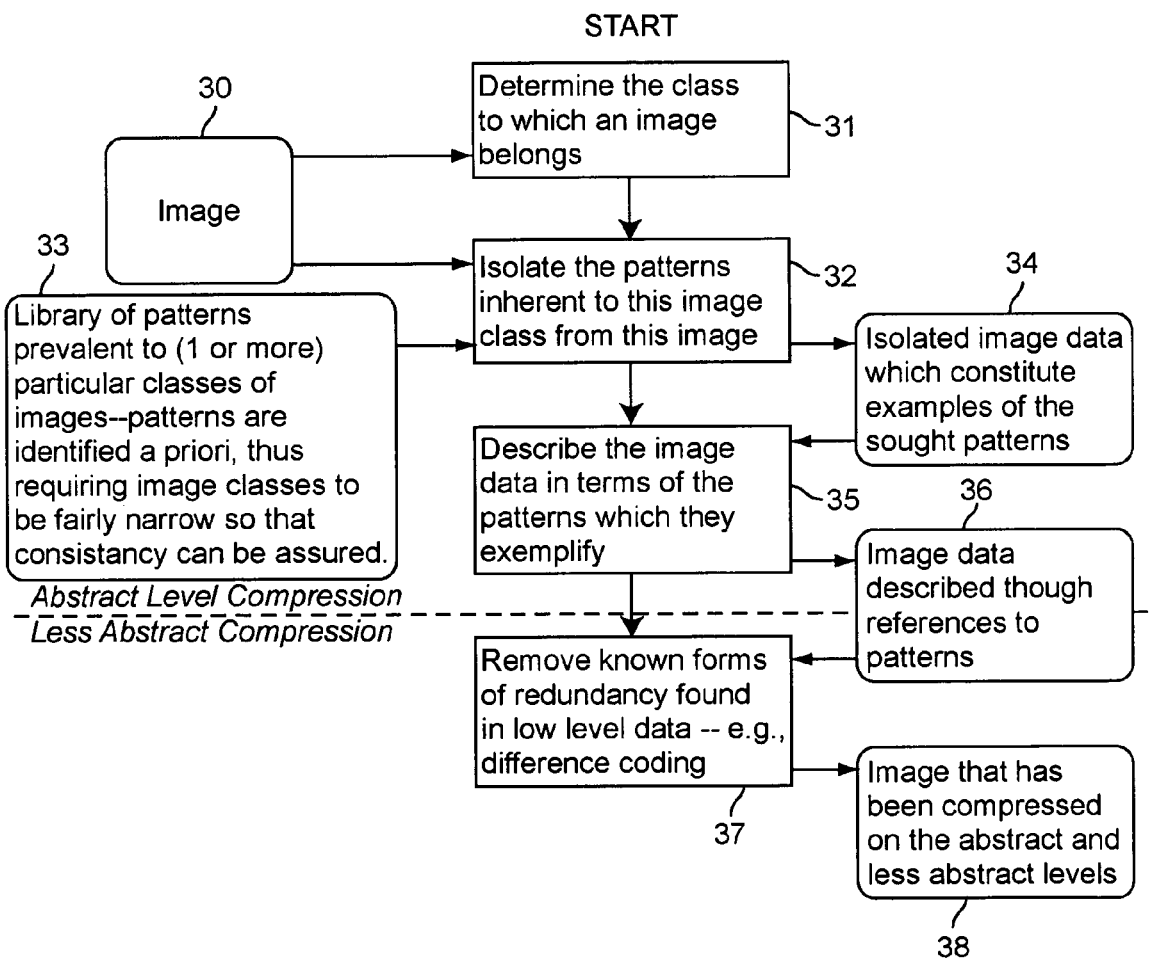
FIG. 3 is a data flow diagram of the compression stages according to the compression technique of the invention.

The data flow is shown in FIG. 3. The image 30 is input, and the process starts in function block 31 by determining the class to which the input image belongs. This analysis is required so that the system performing the analysis knows what patterns to expect—and how to identify them—within this image. The image 30 is further analyzed in function block 32 where the patterns inherent to this image class are isolated. This is done according to the manner prescribed for that particular class of image, by access to a library 33 of patterns prevalent to particular classes of images—in particular, the class to which this image belongs. Such patterns are identified a priori, thus requiring image classes to be fairly narrow so that consistency can be assured; i.e., if the image class is wide, then the patterns present, and the means of identifying them may change considerably from image to image. At this point, the image data that correlate to the various sought patterns are isolated and stored separately. This may involve complex steps of image analysis, or simply requesting certain data from the system that generated the image. These isolated image data are temporarily stored at 34. In function block 35, the image data are described in terms of the patterns which they exemplify.

That is, the data themselves are discarded in favor of parameterized pattern references that, when followed through, produce something sufficiently close to the original data. These new image data—described through references to patterns—are temporarily stored at 36. Then, in function block 37, known forms of redundancy found in the low level data are removed. The output at 38 is the image that has been compressed on the abstract and less abstract levels.

Figure 4:
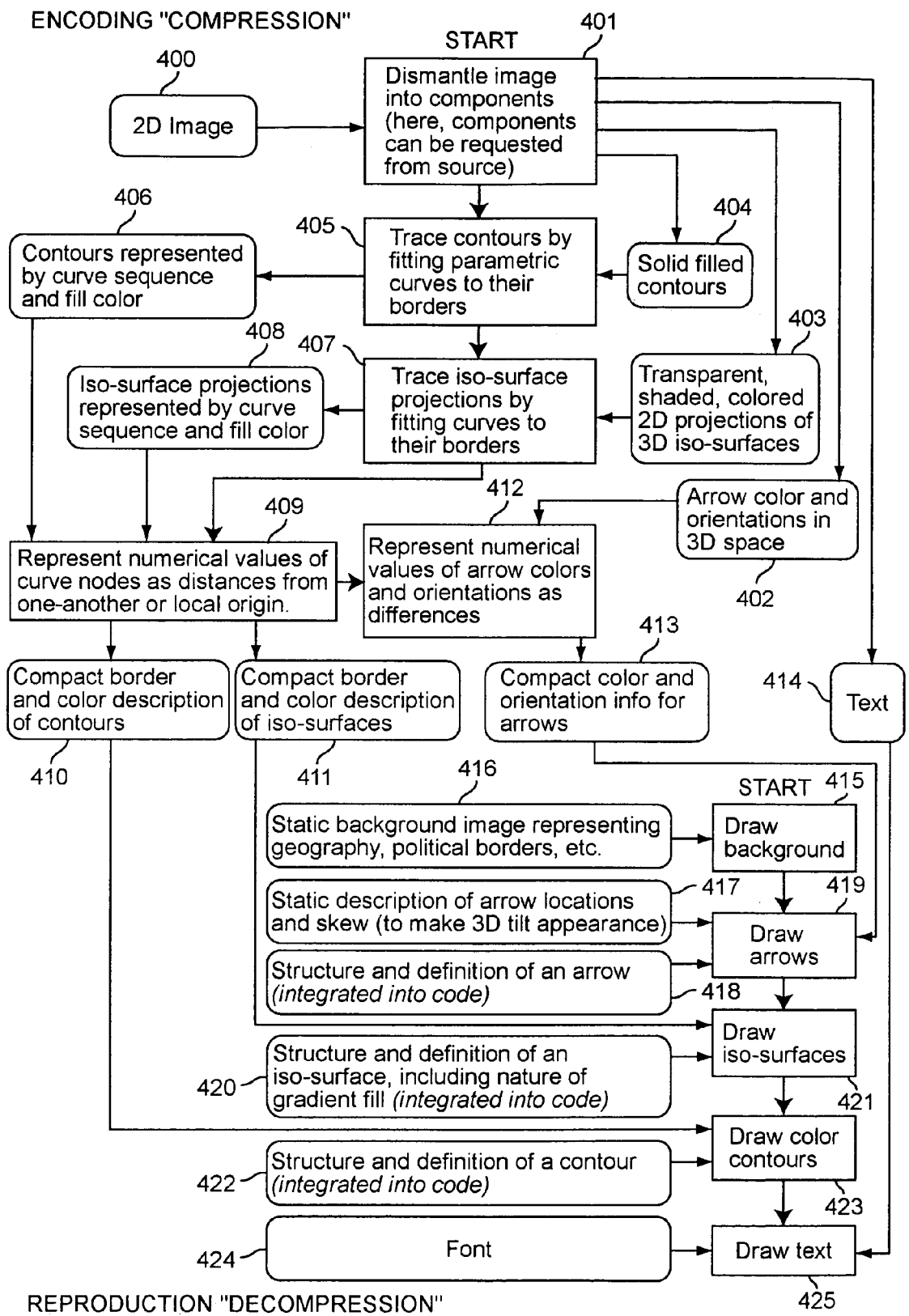
FIG. 4 is a detailed flow diagram of the compression technique of the invention as specifically reduced to practice.

The process, in more detail, as applied to a specific reduction to practice is shown in FIG. 4. The 2-D image 400 is input to start the process. In function block 401, the input image is dismantled into components. These include arrow color and orientations in 3-D space 402, transparent, shaded, colored 2-D projections of 3-D iso-surfaces 403, and solid filled contours 404. The process of dismantling the image into components is performed, in this case, by requesting each desired component from the computer system that generated the image which is under analysis. In function block 405, the contours are traced by fitting parametric curves to their borders. In this case, the borders are fit with sequences of second-order Bèzier curves. The contours, each of which is now represented by a curve sequence and fill color, are temporarily stored at 406. Next, in function block 407, the iso-surface projections are traced by fitting curves to their boundaries, as was done with the contours. The iso-surface projections, each of which is represented by a curve sequence and fill color, are temporarily stored at 408. Next, in function block 409, the data temporarily stored at 406 and 408 are accessed and the data they contain, numerical values of the coordinates of the curve nodes, are processed so as to minimize, or at least reduce, the size of the values that must be recorded. This re-representation can be performed by exploiting the pattern that each curve node is relatively near its predecessor, by storing only the vector distance of a given point from the prior point. Alternately, point coordinates are be represented as distances from a local bottom-left origin, which allows the removal of the sign bit from the values stored that way. For each curve sequence, both of these techniques are evaluated to determine which provides the maximum efficiency. This newly generated, compact border and color description of contours are temporarily stored at 410, and of the equivalent for the iso-surfaces are temporarily stored at 411. In function block 412, the data stored at 402 is accessed and the numerical values of arrow colors and orientations are represented as differences from the previous value—which exploits the relative nearness of each value to its predecessor. This compact color and orientation information for the arrows are temporarily stored at 413.

The process in function block 401 also separates text, which is again given separately by the system that generates the images to begin with. It is temporarily stored at 414. The data temporarily stored at 410, 411, 413, and 414 is accessed in the next stage of the scheme, the decompression phase. In function block 415, data representing the static background of the image representing geography, political borders, and the like are accessed at 416 and the background is drawn. In this embodiment, the geopolitical background is sent to the user only once, and kept in a cache. Similarly, the static description of arrow locations and skew (the skew is used to give the appearance of a 3-D tilt) at 417 is also sent only once. In order to actually draw the arrows, the location and skew information of 417, as well as the structure and definition of an arrow (integrated into code) at 418, and the data at 413 are accessed and then the arrows are drawn in function block 419. The data (including border description and fill color) stored at 411 and the structure and definition of an iso-surface, including the nature of the gradient fill (integrated into code) at 420, are accessed in function block 421 to draw the iso-surfaces. The data stored at 410 and the structure and definition of a contour (integrated into code) at 422 are accessed in function block 423 to draw color contours. Finally, the text stored at 414 and font at 424 are accessed to draw the text in function block 425.

Figure 1:
FIG. 1 is an image illustrating a reconstruction of a data file representing a 2-D projection of a 3-D image compressed using the technique according to the present invention.
Figure 5:
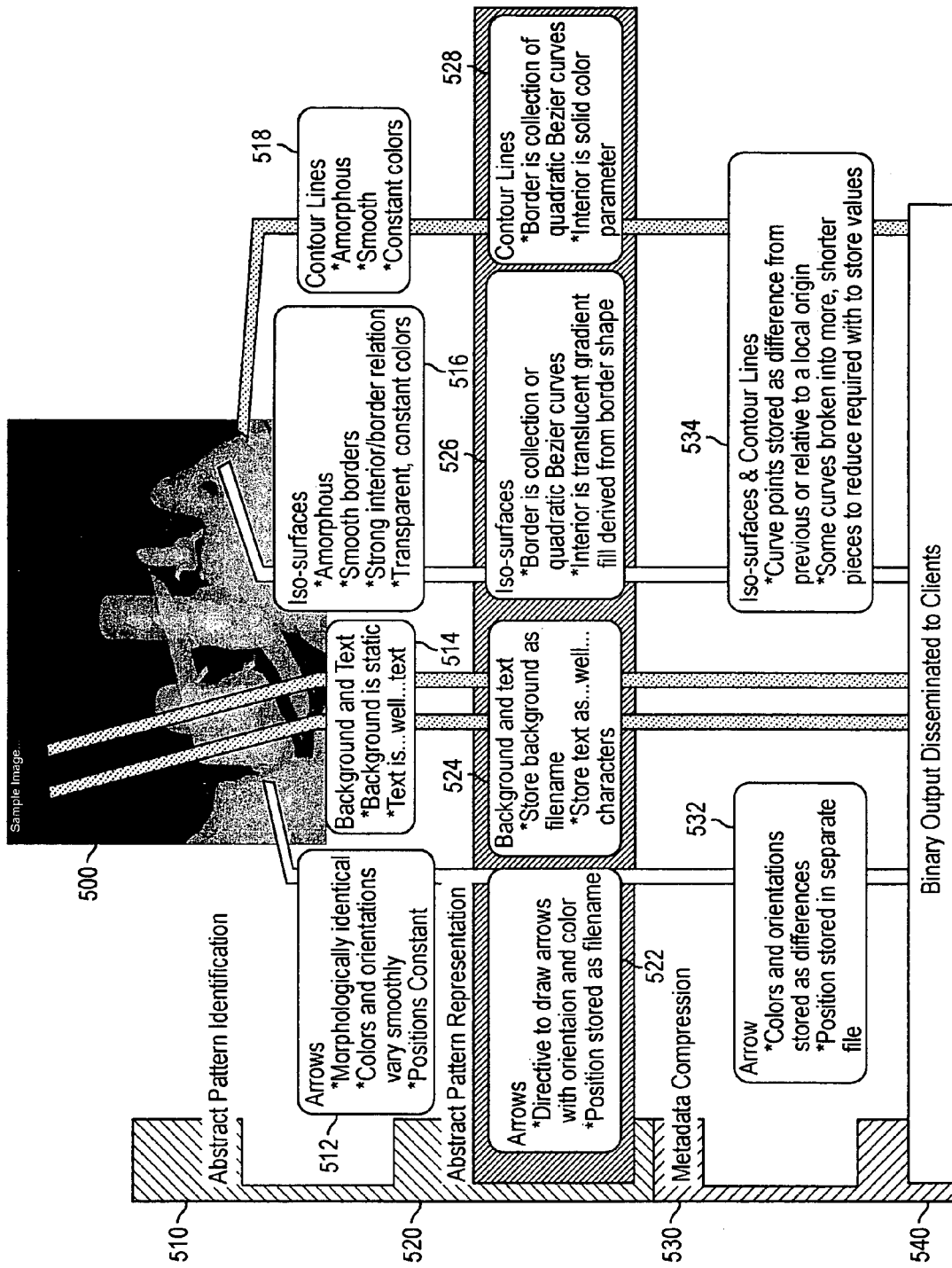
FIG. 5 is a data flow diagram illustrating the compression technique of the invention.

The process is summarized in FIG. 5. An image 500, for example the image of FIG. 1, is input. This image is a 2-D projection of 3-D weather simulation which is characterized by image components that are readily separable with a static background for a given geography. The first level of compression 510 is abstract pattern identification. This comprises separation of arrows 512, background and text 514, iso-surfaces 516, and contour lines 518. The arrow are morphologically identical, their colors and orientations vary smoothly, and their positions are constant. The background is static for the given geography and may include political boundaries or other indicia. The iso-surfaces are amorphous and characterized by smooth borders, strong interior/border relations, and transparent, constant colors. The contour lines are also amorphous and characterized by smooth lines and constant colors. The next level of compression 520 is abstract pattern representation. This includes arrows 522, background and text 524, iso-surfaces 526, and contour lines 528. At this level of the compression technique, arrows are represented by a directive to draw arrows with an orientation, color and position, and the representation stored. The background is stored as a file name, and the text is stored as characters. The iso-surfaces borders are represented as a collection of quadratic Bèzier curves with translucent gradient interior fill derived from border shapes. The contour lines are represented as a collection of quadratic Bèzier curves with an interior solid color. The final level of compression 530 is metadata compression. This includes arrows 532 and iso-surfaces and contour lines 534. The colors and orientations of arrows are stored as differences, and their positions are stored in a separate file. The curve points (or nodes) of iso-surfaces and contour lines are stored as differences from previous points or relative to a local origin, and some curves are broken into more and thereby shorter pieces. The final binary output 540 is disseminated to clients which can be done rapidly over narrow bandwidth communication links.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of image compression comprising the steps of:

analyzing an image in terms of perceptual constructs of the human visual system;

searching for patterns among analyzed abstractions of the image;

describing the image in terms of the perceptual constructs and the patterns found among them;

for a given image that is in a same "class" as the image, re-representing the given image by describing the given image as a collection of parameterized versions of patterns prevalent in that same "class" of image;

taking a resulting description outside of the context of abstract patterns;

looking for redundancies in the description, then re-representing the description so as to eliminate the redundancies and thereby compress the description;

re-representing patterns with smoothly curved borders and an interior fill that can be parameterized and is either largely derivable from other image data or constant, as curve sequences and parameters required to describe the interior of the pattern; and re-representing pattern groups with constant structure that vary only in terms of a spatial parameter as references to the pattern group, and a list of the values for the required parameters, each value being for each subsequent pattern for the group.

2. The method of image compression recited in claim 1, wherein the patterns identified, image components, parameterization of patterns, and lower level numerical encodings are all designed around images belonging to a narrow class of images.

3. The method of image compression recited in claim 2, wherein the narrow class of images are two-dimensional projections of three-dimensional visualizations of data generated by numerical weather simulations.

4. The method of image compression recited in claim 1, wherein the spatial parameter is orientation or color.

5. A method of compression of two-dimensional projections of three-dimensional visualizations of image data comprising the steps of:

inputting a two-dimensional image;

dismantling the two-dimensional image into components, wherein the step of dismantling the input image into components includes separation of solid filled contours, transparent, shaded colored two-dimensional projections of three-dimensional iso-surfaces, arrow color and orientations in three-dimensional space;

tracing contours defined by the boundary of the components by fitting parametric curves to the borders of the contours;

tracing three-dimensional visualization of the image by fitting curves to the borders of the contours;

representing numerical values of curve nodes as distances from one another or a local origin;

storing compact border and color description of the contours and compact border and color description of the iso-surfaces;

representing numerical values of arrow colors and orientations as differences; and storing compact color and orientation information for arrows and separated text.

6. The method of compression of two-dimensional projections of three-dimensional visualizations of image data recited in claim 5, further comprising the steps of:

receiving the compact border and color description of the contours, the compact border and color description of the iso-surfaces, the compact color and orientation information for arrows, and text; and decompressing the received information to generate a representation of the original two-dimensional image.

7. The method of compression of two-dimensional projections of three-dimensional visualizations of image data recited in claim 6, wherein the step of decompressing comprises the steps of:

accessing a static background image representing geography and drawing the background;

accessing a static description of arrow locations and skew, structure and definition of an arrow, and the received compact color and orientation information for arrows and drawing arrows;

accessing structure and definition of an iso-surface and the received compact border and color description of the iso-surfaces and drawing iso-surfaces;

accessing structure and definition of a contour and the received compact border and color descriptions of the contours and drawing color contours; and accessing the received text and drawing text.

8. The method of image compression recited in claim 2, wherein the images are of the class exemplified by 2-D projections of 3-D weather model images.

9. The method of compression of two-dimensional projections of three-dimensional visualizations of image data recited in claim 5, wherein the data are generated by numerical weather simulations.

* * * * *